Figure 4:
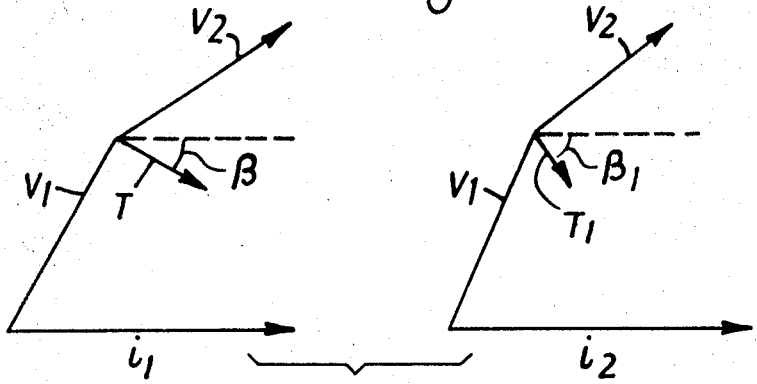

United States Patent

[11] 3,575,572

| [72] | Inventor | Rodney Walter Levinge |
| | | Farnborough, Hampshire, England |
| [21] | Appl. No. | 838,745 |
| [22] | Filed | July 3, 1969 |
| [45] | Patented | Apr. 20, 1971 |
| [73] | Assignee | The Solartron Electronic Group Limited |
| | | Farnborough, Hampshire, England |
| [32] | Priority | July 8, 1968 |
| [33] | | Great Britain |
| [31] | | 32573/68 |

[54] WELDING CONTROL
9 Claims, 6 Drawing Figs.

[52] U.S. Cl. .................................................. 219/110,
[51] Int. Cl. ................................................ B23k 11/24
[50] Field of Search .......................................... 219/108–
—110, 114

[56] References Cited
UNITED STATES PATENTS

| 2,322,052 | 6/1943 | Qgden et al. ................ | 219/109 |
| 3,345,493 | 10/1967 | Guettel et al. ............... | 219/110 |

Primary Examiner—J. V. Truhe
Assistant Examiner—J. G. Smith
Attorneys—William R. Sherman, Stewart F. Moore, Jerry M. Presson, Roylance, Abrams, and Berdo & Kaul ABSTRACT: A method and apparatus for resistance welding in which a first voltage is derived including the voltage drop between welding electrodes and from this an output voltage is derived by subtraction of a substantially fixed voltage from the first voltage. Welding current is arrested when the output voltage falls by a predetermined amount.

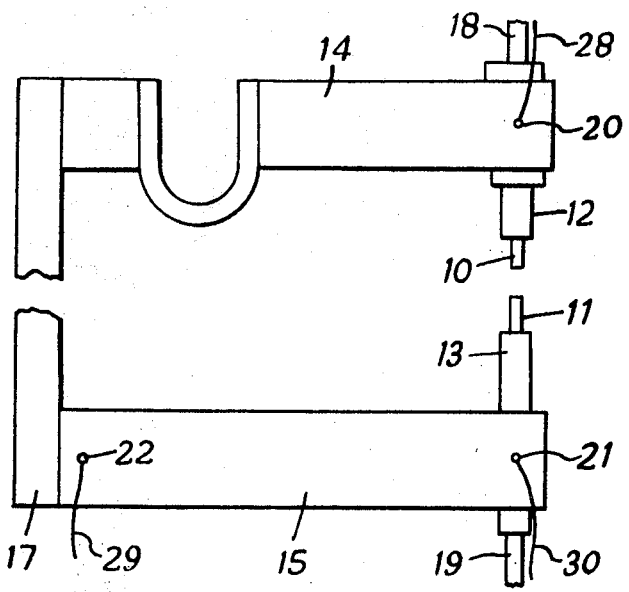
Fig.1.
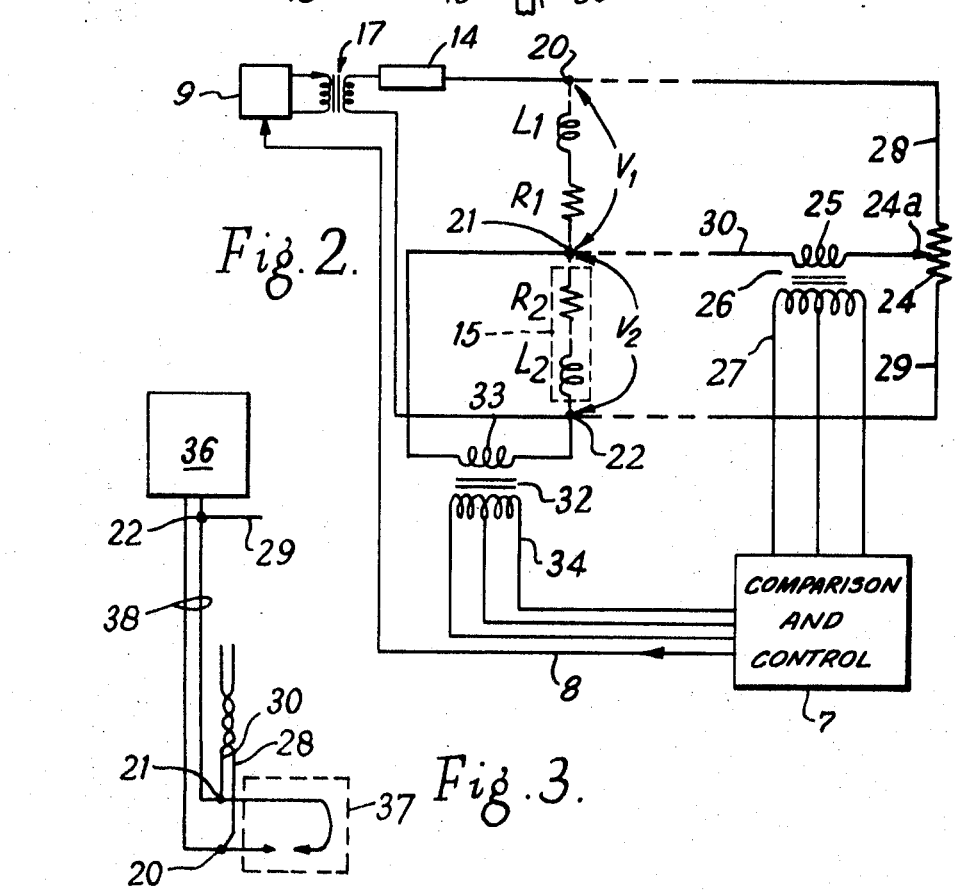
Fig.2.
Fig.3.

WELDING CONTROL

The present invention relates to a method of and apparatus for controlling the duration of a resistance welding operation.

In resistance welding there is a sudden drop in the resistance of the workpiece while the metal is in a molten state. If the welding current is allowed to continue this results in a discharge of molten metal causing a "splashed weld." We have found that it is desirable that the current flow should be stopped immediately after the commencement of the sudden drop in resistance, and copending U.S. Pat. application, Ser. No. 720,208, assigned to the same assignee as the present invention discloses an invention which exploits this discovery. Briefly, our aforementioned application discloses an invention in which a succession of separate electrical signals are generated dependent respectively upon the voltage across and the current through a workpiece being welded during successive half cycles of the alternating welding current. A corresponding succession of electrical signals dependent upon the resistance of the workpiece are derived from the first mentioned signals. The difference between successive ones of the signals dependent upon resistance is detected and when this difference exceeds a predetermined amount the welding current is stopped. Typically this predetermined difference in resistance corresponds to a change of about 5 percent in the voltage across the workpiece. By deriving and utilizing a signal dependent upon the resistance of the workpiece to control the duration of the welding operation any fluctuations in the supply voltage, such as may be caused by neighboring welders, have little effect on the duration and quality of the weld.

It has also been proposed to measure the voltage across the welding electrodes continuously during the welding operation and to compare the voltage continuously with the initial voltage.

The techniques utilizing signals dependent upon the voltage across the workpiece involve attaching leads to the welding apparatus. In order to obtain a useful change in voltage with change in resistance of the workpiece it has been usual to attach these leads to the welding electrodes as close as possible to the workpiece. These leads can impede an operator in the use of the welding apparatus. Furthermore for welders in constant use it is necessary regularly to change the weld electrodes and any additional operation to disconnect and reconnect the leads would be both inconvenient and time consuming and would add to costs.

According to the present invention there is provided a method of resistance welding in which a predetermined change in an electrical signal dependent upon the voltage across a workpiece being welded is detected and used to stop the flow of welding current, comprising the steps of positioning the workpiece between two electrodes, initiating current flow through the electrodes and the workpiece, deriving a first electrical signal S dependent upon the voltage across the electrodes, deriving a second electrical signal substantially unaffected by a change in $\delta S$ in the magnitude $S$ of the first signal due to change in the impedance of the workpiece during the welding process, deriving a third electrical signal T from the first and second signals in such a manner that the change $\delta S$ results in a change $\delta T$ in the magnitude of $T$ of the third signal, the ratio $\delta T/T$ being greater than the ratio $\delta S/S$, detecting a predetermined change in the magnitude of the third signal and utilizing the last said predetermined change to stop the flow of welding current. Preferably the second electrical signal is derived from the same electrical supply as the first signal so that any changes in the first signal due to transients in the supply, caused by other welding apparatus for example, appear proportionately in the second signal. Thus a substantial immunity from impulsive interference can be provided.

In a preferred method the second signal is made dependent upon the current through the electrodes and the steps of detecting the predetermined change in the third signal and utilizing the change to stop the flow of weld current further comprise the steps of deriving a succession of fourth electrical signals each being dependent upon the third signal throughout a respective one of a succession of predetermined periods, deriving a succession of fifth electrical signals each being dependent upon the second signal through a respective one of the said predetermined periods, deriving a succession of sixth electrical signals from respective fourth and fifth signals, each sixth signal being dependent upon the impedance of the workpiece throughout a respective one of the predetermined periods, detecting the difference between each sixth signal and the next succeeding sixth signal, and stopping the flow of current when the difference reaches a predetermined amount.

Apparatus for use in carrying out the invention includes first and second means attachable to welding apparatus for deriving a first electrical signal dependent upon the voltage across weld electrodes in welding apparatus, third and fourth means attachable to the welding apparatus for deriving a second electrical signal substantially unaffected by any change $\delta S$ in the magnitude $S$ of the first signal due to a change in the impedance of the workpiece being welded, a circuit for deriving a third electrical signal from the first and second signals in such a manner that the change $\delta S$ results in a change $\delta T$ in the magnitude of $T$ of the third signal, the ratio $\delta T/T$ being greater than the ratio $\delta S/S$, means for detecting a predetermined change in the magnitude of the third signal and means for utilizing the last said predetermined change to stop the flow of welding current.

In a preferred arrangement of the apparatus, in welding apparatus the first and second means are attached to the ends of the current supply arms, or leads, of the welding apparatus which feed the welding electrodes and the third and fourth means are attached near to the two ends respectively of one of current supply arms or leads. The second and third means are attached to a common point in the welding apparatus. The circuit for deriving the third signal includes a first impedance having its ends connected to the first and fourth means respectively and a second impedance having its ends connected to the common second and third means and to an intermediate point in the first impedance respectively. The third signal is developed across the second impedance.

Further according to the present invention there is provided resistance welding apparatus comprising two electrodes adapted for contacting a workpiece, means for initiating current flow through the electrodes and the workpiece, means for deriving a first electrical signal dependent upon the voltage across welding electrodes, means attached to the welding apparatus for deriving a second electrical signal substantially unaffected by any change $\delta S$ in the magnitude $S$ of the first signal due to a change in the impedance of a workpiece being welded, a circuit for deriving a third electrical signal from the first and second signals in such a manner that the change $\delta S$ results in a change $\delta T$ in the magnitude $T$ of the third signal, the ratio $\delta T/T$ being greater than the ration $\delta S/S$, means for detecting a predetermined change in the magnitude of the third signal and means for utilizing the last said predetermined change to stop the flow of welding current.

An embodiment of the invention will now be described, by way of example, with reference to the accompanying drawings in which:

FIG. 1 is a schematic diagram of part of a pedestal-type resistance welder adapted for use with the invention, FIG. 2 shows a circuit diagram of apparatus for use in the invention, FIG. 3 is a schematic diagram of part of a pendant-type resistance welder adapted for use with the invention, and FIGS. 4 and 5 are explanatory diagrams.

The welder of FIG. 1 comprises welding electrodes 10 and 11 detachably mounted in electrode holders 12 and 13 respectively. The holders 12 and 13 are fixed to one end of respective current supply arms 14 and 15, the other ends of the arms being connected to he secondary winding of a welding transformer 17. Pneumatic means (not shown) are provided for moving one electrode in relation to the other so that a workpiece to be welded may be clamped under pressure between the tips of the electrodes.

A terminal 20 is fixed to the electrode end of the arm 14 and terminals 21 and 22 are fixed to the electrode and transformer ends respectively of the arm 15. In operation, a voltage $V_1$ appears between the terminals 20 and 21 which includes the voltage drop across the workpiece, and a voltage $V_2$ dependent upon the current through the electrodes appears between the terminals 21 and 22.

The upper and lower arms 14 and 15 and the electrode holders 12 and 13 are cooled by water supplied by pipes 18 and 19.

In FIG. 2 there is shown a circuit consisting of a potentiometer 24 having its wiper 24a connected to one of a primary winding 25 of a transformer 26. The ends of the potentiometer 24 are connected to the terminals 20 and 22 by way of wires 28 and 29 respectively. The end of the primary winding 25 remote from the wiper of the potentiometer 24 is connected to the terminal 21 by way of a wire 30. The wires 28 and 30 are conveniently led along the cooling-water pipes 18 and 19 of FIG. 1.

For simplicity the components 24 and 26 are shown connected to the terminals 20, 21 and 22 by means of broken lines. Terminal 20 is connected through arm 14 to transformer 17, and point 22 is connected directly to the transformer. As described in application Ser. No. 720,208, transformer 17 is supplied with welding power by an ignition control device 9 of conventional type, the action of the control device being controlled by a signal supplied on a conductor 8.

The circuit between the terminals 20 and 21 with a workpiece clamped between the electrodes contains both inductance and resistance which are shown in FIG. 2 as an inductor $L_1$ and a resistor $R_1$. Similarly an inductor $L_2$ and resistor $R_2$ are shown in FIG. 2 between the terminals 21 and 22 to represent the inductance and resistance of the arm 15 between the terminals 21 and 22.

The voltage levels in the circuit will be referred to the level at the terminal 20. The voltage across the potentiometer 24 will be the vector sum of the voltages $V_1$ and $V_2$. The wiper 24a will be set to a fraction $K$ of the maximum value of the resistance of the potentiometer measured from its top end.

In operation, when current is passed through a workpiece, the voltage $T$ across the primary 25 of the transformer is $$T = V_1 - K(V_1 + V_2)$$

At splash the resistance R of the workpiece changes and the voltage across the workpiece drops to $V_1 - \delta_1$. The voltage across the primary 25 is then $T - \delta T = V_1 - \delta V_1 - K(V_1 - \Psi_1 + V_2)$
The per-unit change in the voltage across the primary is $$\frac{\delta T}{T} = \frac{-\delta V_1(1-K)}{V_1 - K(V_1 + V_2)}$$

In one example the drop $\delta R$ in resistance of a workpiece was about 5 percent and for values of $K$ between 0.36 to 0.48, the effective drop, measured as the change $\delta T$ in the voltage across the primary 25, ranged from 9 percent to 33.6 percent.

The use of the arrangement of FIG. 2 thus provides a signal in which the percentage change at splash is greater than that appearing across the workpiece. In addition it enables the change to be sensed at a convenient point away from the electrodes.

The change in voltage across the primary of the transformer 26 can be used to control a resistance welding operation by means of the method and apparatus disclosed in the specification of copending Pat. Application No. 720,208. For this a second transformer 32 is necessary, having its primary 33 connected between the terminals 21 and 22 such that a voltage dependent upon the current through the workpiece is induced in the primary.

The transformers 26 and 32 are then equivalent to the transformers 18 and 21 in FIG. 1 of our aforementioned specification. As described therein the voltages appearing at the secondary windings 27 and 34 of the two transformers are connected to a sampling and control circuit 7 wherein the voltages are sampled once each half-cycle of the alternating welding current. Signals dependent upon the ratio of the two voltages are derived and the magnitude of each signal is compared with that of the signal in the next preceding half-cycle. When the difference between two successive signals exceeds a predetermined amount a control signal is generated and is conveyed to unit 9 on conductors 8 to stop the flow of weld current. The sampling and control circuit 7, as described in application Ser. No. 720,208, includes a timing circuit which permits two integrator circuits to sample the voltages developed on windings 27 and 34. The integrator outputs are then combined to produce a signal representative of the mean impedance of the circuit across the weld during each half-cycle of weld current. The signal thus derived is then stored on a capacitor. During the next half-cycle, the sampling operation is repeated and the resulting impedance signal, or a signal representative thereof, is applied to the same capacitor. If the current-voltage relationship at the weld apparatus remains the same, or nearly the same, during successive half-cycles, the charge on the capacitor does not vary significantly. However, when the weld circuit impedance varies substantially, the capacitor charge is decreased rapidly from one half-cycle to the next. Circuit 7 includes means for detecting a charge change in excess of a predetermined amount. That change is interpreted as being indicative of the splash point and weld current is terminated.

The presence of the inductances $L_1$ and $L_2$ (FIG. 2) has the effect in the apparatus described in the aforesaid specification of increasing the sensitivity to a change in resistance between the electrodes. This can be explained as follows:

The full expression for $V_1$ with an initial current of $i_1$ flowing is $$V_1 = i_1(R_1 + j\omega L_1)$$

and $$V_2 = i_1(R_2 + j\omega L_2)$$

Thus $$T = i_1(R_1 + j\omega L_1) - Ki_1[(R_1 + R_2) + j\omega(L_1 + L_2)]$$

When the resistance R decreases at splash the fractional change in the total resistance in the circuit is small and hence the new current $i_2$ is little different from $i_1$ and substantially no change occurs in $V_2$. However for completeness regard will be had for the small change that occurs and putting $T - \delta T = T_1$ $$T_1 = i_2(R_1 - R_1 + j\omega L_1) - Ki_2[(R_1 + R_2 - \delta R_1) + j\omega(L_1 + L_2)]$$

These two expressions for $T$ and $T_1$ can be represented by the vector diagrams of FIG. 4 from which it will be seen that not only is $T_1$ smaller than $T$ but also the phase-angle $\beta_1$ of $T_1$ differs from the phase-angle $\beta$ of $T$.

As $T$ is sampled every half-cycle when used in the apparatus described in the aforesaid specification and the phase of the sample periods does not change the sample of $T_1$ is over a different angle from that of the sample of $T$.

This is shown, for example, in FIG. 5.

Figure 5A:
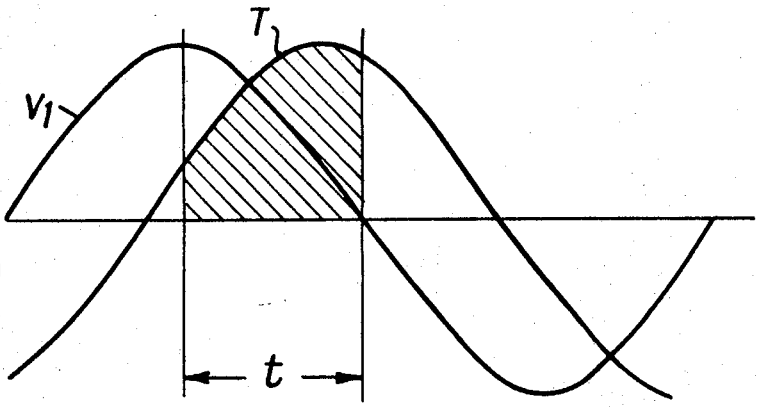
Figure 5B:
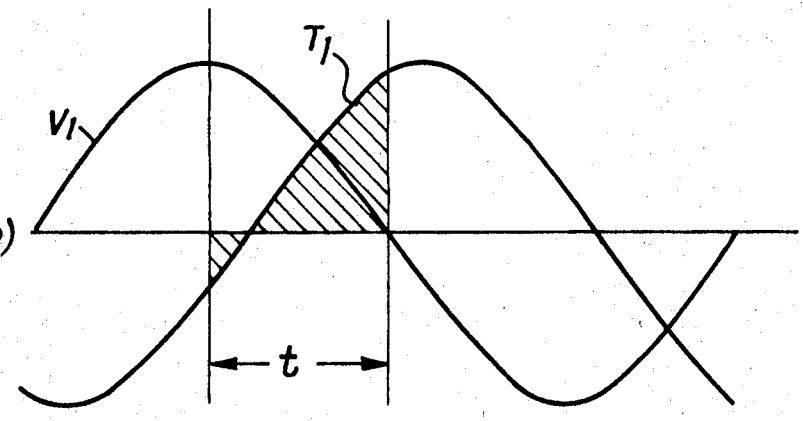

FIG. 5a shows the voltages $V_1$ and $T$ in response to the current $i_1$ before the onset of splash whereas FIG. 5b shows the voltages $V_1$ and $T_1$ at the onset of splash. The amplitudes of $V_1$, $T$ and $T_1$ are unrelated to actual values and have been shown to be equal for illustration of the effect of phase-shift.

The sample period $t$ is the same for both samples and occupies about 90° stretching from 90° to 180° in $V_1$. It will be seen from the cross-hatched part of $T$ that it stretches from about 20° to 110° in $T$ whereas it stretches from about −20°(+340°) to 70° in $T_1$. It is the area under the $T$ and $T_1$ curves (cross-hatched) which is effective and this will be seen to be smaller in $T_1$ than in $T$ which disregard in FIG. 5 the reduction in amplitude of $T_1$ compared with $T$.

Thus, in summary, the change in $T$ is accentuated by the effect of the phase shift and hence the sensitivity is improved.

FIG. 3 shows a pendant welder including a welding transformer 36 connected to a welding gun shown within a broken line 37 by way of a twin-wire "kickless" cable 38. In operation, the terminals 20 and 21 would be connected to the welding-gun ends of the wires in the cable 38 and the terminal 22 would be connected to the transformer end of one of the wires in the cable 38.

Although the application of the present invention has been described in relation to our aforementioned specification, it can with advantage be used with other resistance welding apparatus in which a change in the voltage across the workpiece is detected and used to control the duration of the welding operation.

I claim:

1. A method of resistance welding in which a predetermined change in an electrical signal representative of the voltage across a workpiece being welded is detected and used to stop the flow of welding current, comprising the steps of positioning the workpiece between two electrodes, initiating current flow through the electrodes and the workpiece, deriving a first electrical signal having a magnitude $S$ representative of the voltage across the electrodes from points in the welding current path spaced from the electrodes, deriving a second electrical signal substantially unaffected by a change $\delta S$ in the magnitude of $S$ of the first signal due to a change in the impedance of the workpiece during the welding process, deriving a third electrical signal $T$ from the first and second signals in such a manner that the change $\delta S$ results in a change $67$ $T$ in the magnitude $T$ of the third signal, the ratio $\delta T/T$ being greater than the ratio $\delta S/S$, detecting a predetermined change in the magnitude of the third signal and utilizing the last said predetermined change to stop the flow of welding current.

2. A method according to claim 1, wherein the second electrical signal is derived from the same electrical supply as the first signal.

3. A method according to claim 2, wherein the second electrical signal is made dependent upon the current through the electrodes.

4. A method according to claim 3, and comprising the steps of deriving a succession of fourth electrical signals each being representative of the third signal throughout a respective one of a succession of predetermined periods, deriving a succession of fifth electrical signals each being representative of the second signal throughout a respective one of the said predetermined periods, deriving a succession of sixth electrical signals from respective fourth and fifth signals, each sixth signal being dependent upon the impedance of the workpiece throughout a respective one of the predetermined periods, detecting the difference between each sixth signal and the next succeeding sixth signal, and stopping the flow of current when the difference reaches a predetermined amount.

5. Apparatus for use in resistance welding comprising first and second means attachable to welding apparatus at points spaced from the weld electrodes for deriving a first electrical signal representative of the voltage across weld electrodes in welding apparatus, third and fourth means attachable to the welding apparatus for deriving a second electrical signal substantially unaffected by any change $S$ in the magnitude $S$ of the first signal due to a change in the impedance of a workpiece being welded, circuit means for deriving a third electrical signal from the first and second signals in such a manner that the change $\delta S$ results in a change $\delta T$ in the magnitude $T$ of the third signal, the ratio $\delta T/T$ being greater than the ratio $\delta S/S$, means for detecting a predetermined change in the magnitude of the third signal and means for utilizing the last said predetermined change to stop the flow of welding current.

6. Apparatus according to claim 5, wherein the first and second means are attached to the ends of the current supply arms, or leads, of the welding apparatus which feed the welding electrodes and the third and fourth means are attached near to the two ends respectively of one of the current supply arms or leads, the second and third means being attached to a common point in the welding apparatus.

7. Apparatus according to claim 6, wherein the circuit for deriving the third signal includes a first impedance having its end connected to the first and fourth means respectively and a second impedance having its ends connected to the common second and third means and to an intermediate point in the first impedance respectively, the third signal being developed across the second impedance.

8. Resistance welding apparatus comprising two electrodes adapted for contacting a workpiece, means for initiating current flow through the electrodes and the workpiece, means for deriving a first electrical signal $S$ representative of the voltage across the welding electrodes from points on said welding apparatus spaced from said electrodes, means attached to the welding apparatus for deriving a second electrical signal substantially unaffected by any change $\delta S$ in the magnitude $S$ of the first signal due to a change in the impedance of a workpiece being welded, a circuit for deriving a third electrical signal from the first and second signals in such a manner that the change $\delta S$ results in a change $\delta T$ in the magnitude $T$ of the third signal, the ratio $\delta T/T$ being greater than the ratio $\delta S/S$, means for detecting a predetermined change in the magnitude of the third signal and means for utilizing the last predetermined change to stop the flow of welding current.

9. Resistance welding apparatus comprising two welding electrodes, means for supporting said electrodes and for bringing said electrodes in contact with a workpiece, means for initiating current flow through said electrodes and said workpiece, means connected to said means for supporting said electrodes for producing a first electrical signal $S$ representative of the voltage across said welding electrodes, means attached to said welding apparatus for producing a second electrical signal substantially unaffected by any change $\delta S$ in the magnitude $S$ of said first signal due to changes in the impedance of the workpiece, means for producing a third electrical signal $T$ from said first and second signals so that the change $S$ results in a change $\delta T$ in the magnitude $T$ of said third signal wherein the ratio $\delta T/T$ is greater than the ratio $\delta S/S$, means for deriving a succession of fourth signals each being dependent upon the third signal throughout a respective one of a succession of predetermined periods, means for deriving a succession of fifth electrical signals each being dependent upon said second signal throughout a respective one of said predetermined periods, circuit means for producing a succession of sixth electrical signals from concurrent existing ones of said fourth and fifth signals so that each of said sixth signals is representative of the impedance of said workpiece throughout a respective one of said predetermined periods, and circuit means for detecting the difference in magnitude between each sixth signal and the next succeeding sixth signal and for stopping weld current flow when the difference reaches a predetermined amount.